United States Patent
Harrison et al.

(10) Patent No.: US 11,430,098 B2
(45) Date of Patent: Aug. 30, 2022

(54) CAMERA BODY TEMPERATURE DETECTION

(71) Applicant: AlgoLook, Inc., Richardson, TX (US)

(72) Inventors: David E. Harrison, Frisco, TX (US); Jeremy C. Patton, Sachse, TX (US); John Dankovchik, Plano, TX (US)

(73) Assignee: AlgoLook, Inc., Richardson, TX (US)

( * ) Notice: Subject to any disclaimer, the term of this patent is extended or adjusted under 35 U.S.C. 154(b) by 0 days.

(21) Appl. No.: 17/139,585

(22) Filed: Dec. 31, 2020

(65) Prior Publication Data
US 2021/0211590 A1 Jul. 8, 2021

Related U.S. Application Data

(60) Provisional application No. 62/956,867, filed on Jan. 3, 2020.

(51) Int. Cl.
*G06T 5/50* (2006.01)
*G06N 20/00* (2019.01)
(Continued)

(52) U.S. Cl.
CPC ............ *G06T 5/50* (2013.01); *G05B 13/0265* (2013.01); *G06K 9/6282* (2013.01); *G06N 3/08* (2013.01); *G06N 5/04* (2013.01); *G06N 20/00* (2019.01); *G06V 10/443* (2022.01); *G06V 20/41* (2022.01); *G06V 20/46* (2022.01); *G06V 20/64* (2022.01); *G06V 40/166* (2022.01);
(Continued)

(58) Field of Classification Search
None
See application file for complete search history.

(56) References Cited

U.S. PATENT DOCUMENTS 10,262,226 B1 * 4/2019 Flowers ............ G06K 9/00845
10,847,009 B1 * 11/2020 Sulucz ................ G08B 17/125
(Continued)

FOREIGN PATENT DOCUMENTS

| CN | 112001953 A | * 11/2020 |
| CN | 211978126 U | * 11/2020 |
| CN | 112067139 A | * 12/2020 |

OTHER PUBLICATIONS

Soni, Vishal Dineshkumar and Soni, Ankit Narendrakumar and Pothuganti, Karunakar, Student Body Temperature and Physical Distance Management Device in Classroom Using 3D Stereoscopic Distance Measurement. International Journal of Innovative Research in Science Engineering and Technology 9(9):9294-9299 (Year: 2020).*

*Primary Examiner* — Stefan Gadomski
(74) *Attorney, Agent, or Firm* — Ferguson Braswell Fraser Kubasta LLP (57) ABSTRACT

A method detects body temperature. A first image, a second image, and a thermal image are received. The first image is calibrated with the second image using a calibration model to form a plurality of visible image layers. A distance layer is generated from the first image and the second image using a distance generation model. The thermal image is calibrated using the distance layer and a distance calibration model to form a thermal layer. A face location of a person in the first image is detected using a face detection model. A body temperature of the person at the face location is determined using the thermal layer. The body temperature is presented.

20 Claims, 9 Drawing Sheets

(51) Int. Cl.
  *G05B 13/02*   (2006.01)
  *G06N 5/04*    (2006.01)
  *G06K 9/62*    (2022.01)
  *G06N 3/08*    (2006.01)
  *H04N 5/232*   (2006.01)
  *H04N 5/33*    (2006.01)
  *G06V 10/44*   (2022.01)
  *G06V 20/40*   (2022.01)
  *G06V 20/64*   (2022.01)
  *G06V 40/16*   (2022.01)
  *F24F 11/63*   (2018.01)
  *G06F 16/25*   (2019.01)
  *G01J 5/00*    (2022.01)
  *G01J 5/48*    (2022.01)

(52) U.S. Cl.
  CPC ....... *G06V 40/172* (2022.01); *H04N 5/23219* (2013.01); *H04N 5/33* (2013.01); *F24F 11/63* (2018.01); *G01J 5/48* (2013.01); *G01J 2005/0077* (2013.01); *G06F 16/252* (2019.01); *G06T 2207/10028* (2013.01); *G06T 2207/30201* (2013.01); *G06V 20/44* (2022.01)

(56) References Cited

U.S. PATENT DOCUMENTS

| | | | | |
|---|---|---|---|---|
| 10,997,809 B2* | 5/2021 | Petkov | ............... | H04N 5/232 |
| 11,051,701 B1* | 7/2021 | Gaines | ............... | A61B 5/015 |
| 2004/0261989 A1* | 12/2004 | Hara | ............... | B60H 1/00742 |
| | | | | 165/202 |
| 2011/0118608 A1* | 5/2011 | Lindner | ............... | G01J 5/0025 |
| | | | | 600/474 |
| 2012/0086793 A1* | 4/2012 | Anabuki | ............... | H04N 7/144 |
| | | | | 348/77 |
| 2012/0188355 A1* | 7/2012 | Omi | ............... | A61B 5/1114 |
| | | | | 348/78 |
| 2014/0267758 A1* | 9/2014 | Neff | ............... | H04N 13/243 |
| | | | | 348/164 |
| 2015/0051461 A1* | 2/2015 | Dalal | ............... | A61B 5/0077 |
| | | | | 600/323 |
| 2015/0103141 A1* | 4/2015 | Lee | ............... | G01J 5/0025 |
| | | | | 348/43 |
| 2015/0139271 A1* | 5/2015 | Lee | ............... | B60R 13/025 |
| | | | | 374/121 |
| 2015/0334380 A1* | 11/2015 | Kim | ............... | H04N 13/324 |
| | | | | 348/54 |
| 2017/0127980 A1* | 5/2017 | Rabb | ............... | A61B 5/4806 |
| 2017/0311813 A1* | 11/2017 | Kaiser | ............... | A61B 5/1128 |
| 2017/0372137 A1* | 12/2017 | Kumar | ............... | G06T 17/05 |
| 2018/0092548 A1* | 4/2018 | Tzvieli | ............... | A61B 5/6803 |
| 2018/0103913 A1* | 4/2018 | Tzvieli | ............... | G06K 9/3233 |
| 2019/0080431 A1* | 3/2019 | Choi | ............... | G06T 5/50 |
| 2019/0084372 A1* | 3/2019 | Gallagher | ............... | A61B 5/0077 |
| 2019/0325682 A1* | 10/2019 | Petkov | ............... | H04N 5/33 |
| 2020/0256734 A1* | 8/2020 | Zhu | ............... | A61B 5/70 |
| 2020/0390337 A1* | 12/2020 | Frank | ............... | G01J 5/0265 |
| 2020/0397306 A1* | 12/2020 | Frank | ............... | G01J 5/10 |
| 2021/0078382 A1* | 3/2021 | Maeng | ............... | B60H 1/00814 |
| 2021/0271895 A1* | 9/2021 | Chen | ............... | G06K 9/00771 |

* cited by examiner

CAMERA BODY TEMPERATURE DETECTION

CROSS REFERENCE TO RELATED APPLICATIONS

This application claims priority to U.S. Provisional Application No. 62/956,867, filed on Jan. 3, 2020, which is hereby incorporated by reference herein.

BACKGROUND

Visible light and thermal cameras capture images and video of people in environments. A challenge is to determine the body temperature of people from the images captured with visible light and thermal cameras.

SUMMARY

In general, in one or more aspects, the disclosure relates to a method that detects body temperature. A first image, a second image, and a thermal image are received. The first image is calibrated with the second image using a calibration model to form a plurality of visible image layers. A distance layer is generated from the first image and the second image using a distance generation model. the thermal image is calibrated using the distance layer and a distance calibration model to form a thermal layer. A face location of a person in the first image is detected using a face detection model. A body temperature of the person at the face location is determined using the thermal layer. The body temperature is presented.

In general, in one or more aspects, the disclosure relates to an apparatus that includes a first camera, a second camera, a thermal camera, a processor; and a memory. The memory includes an application. The application executes on the processor, uses the memory, and is configured for detecting body temperature. A first image, a second image, and a thermal image are received. The first image is calibrated with the second image using a calibration model to form a plurality of visible image layers. A distance layer is generated from the first image and the second image using a distance generation model. The thermal image is calibrated using the distance layer and a distance calibration model to form a thermal layer; A face location of a person in the first image is detected using a face detection model. A body temperature of the person at the face location is determined using the thermal layer. The body temperature is presented.

In general, in one or more aspects, the disclosure relates to a system that includes an image sensor system and a server. The image sensor system includes a sensor system application, executing on a processor of the image sensor system, configured for: receiving a first image, a second image, and a thermal image; calibrating the first image with the second image using a calibration model to form a plurality of visible image layers; generating a distance layer from the first image and the second image using a distance generation model; calibrating the thermal image using the distance layer and a distance calibration model to form a thermal layer; detecting a face location of a person in the first image using a face detection model; determining a body temperature of the person at the face location using the thermal layer; and transmitting the body temperature and a face image from the first image to the server. The server includes a server application, executing on a processor of the server, configured for: identifying the person from a face image; and presenting the face image and the body temperature.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure train and use machine learning models determine the body temperature of people captured in images and video. Stereoscopic visible light cameras generate visible light images, referred to as visible images, and a thermal camera generates a thermal image. The visible images and the thermal image are calibrated to determine the overlapping pixels between the three images. The distance between the camera system and the object captured in the image is determined using the stereoscopic visible images. The thermal image is further calibrated based on the distance to the object in the image. A face is detected in one of the visible images using a machine learning model. The pixels that correspond to the forehead of the face in the image are then identified from the visible image. The calibrated thermal values that correspond to the forehead are then processed to determine a body temperature of the person captured in the images.

Figure 1A:
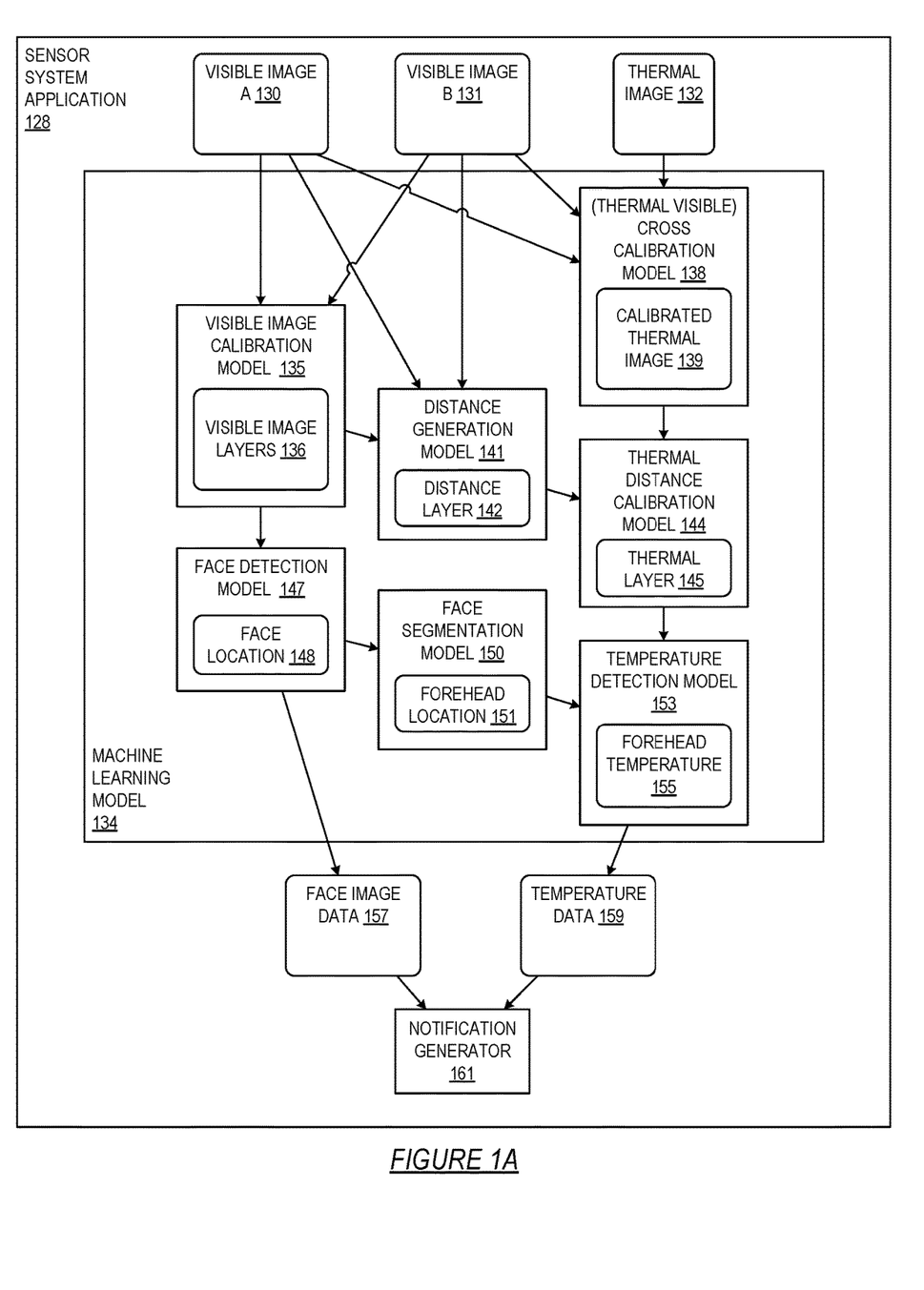
FIG. 1A, FIG. 1B, and FIG. 1C show diagrams of systems in accordance with disclosed embodiments.
Figure 1B:
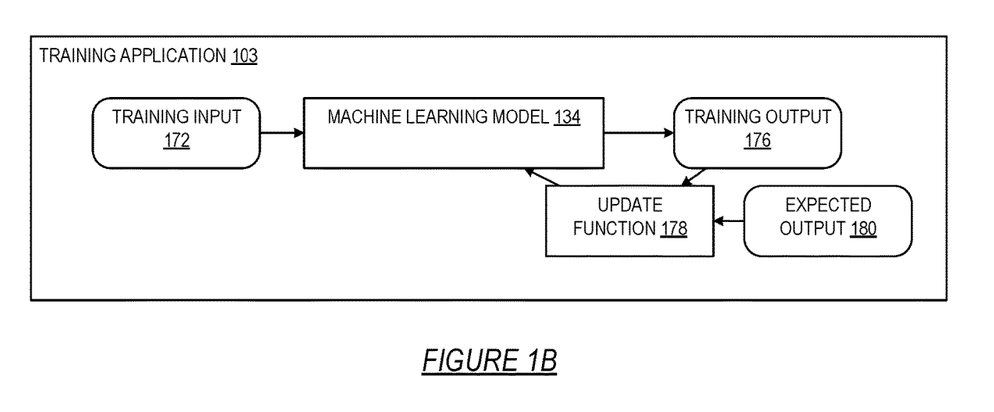
Figure 1C:
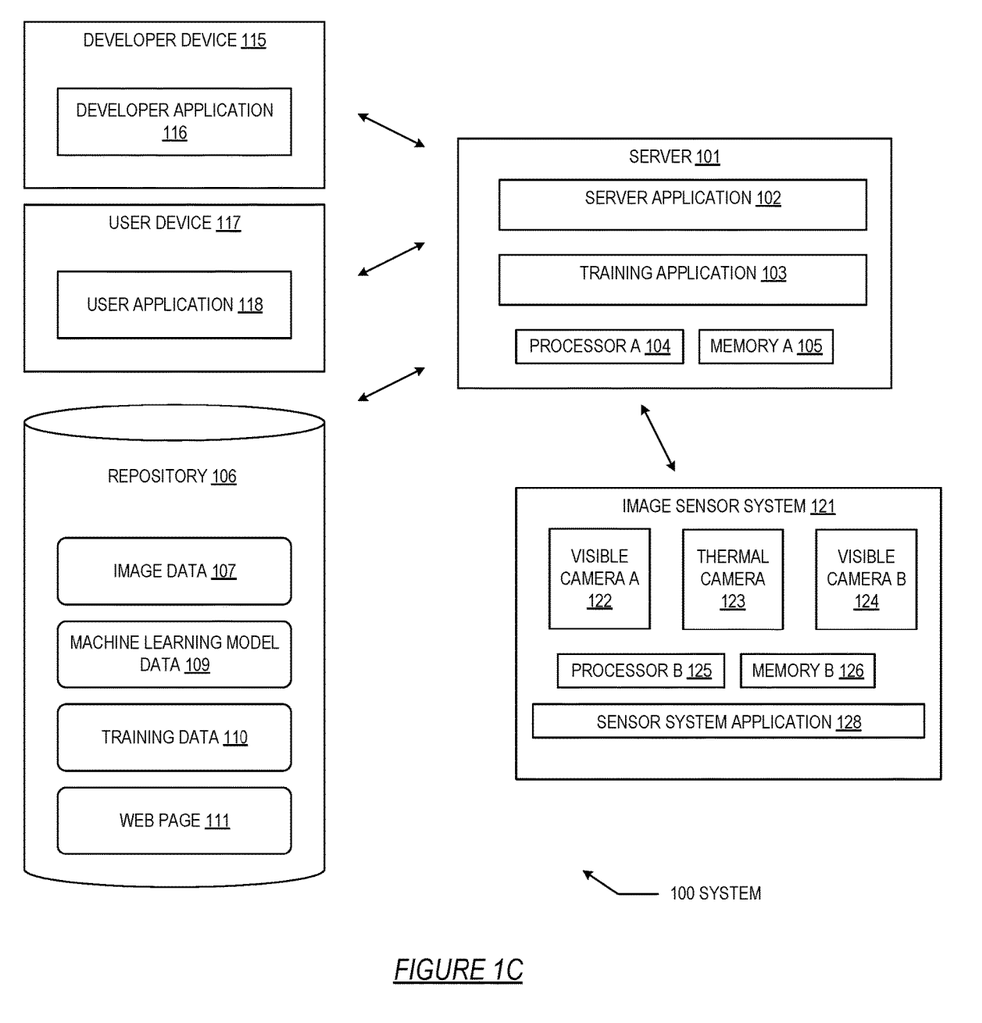

FIGS. 1A, 1B, and 1C show diagrams of embodiments that are in accordance with the disclosure. FIG. 1A shows the sensor system application (128), which uses machine learning models to process visible and thermal images. FIG. 1B shows the training application (103), which trains machine learning models to process visible and thermal images. FIG. 1C shows the system (100), which trains and uses machine learning models to process visible and thermal images. The embodiments of FIGS. 1A, 1B, and 1C may be combined and may include or be included within the features and embodiments described in the other figures of the application. The features and elements of FIGS. 1A, 1B, and 1C are, individually and as a combination, improvements to the technology of machine learning. The various elements, systems, and components shown in FIGS. 1A, 1B, and 1C may be omitted, repeated, combined, and/or altered as shown from FIGS. 1A, 1B, and 1C. Accordingly, the scope of the present disclosure should not be considered limited to the specific arrangements shown in FIGS. 1A, 1B, and 1C.

Turning to FIG. 1A, the sensor system application (128) uses the machine learning model (134) to generate the face image data (157) and the temperature data (159) from the visible image A (130), the visible image B (131), and the thermal image (132). The sensor system application (128) may generate notifications based on the temperature data (159) and the face image data (157). In one embodiment, the sensor system application (128), or a portion thereof, may be executed as part of the server application (102) (of FIG. 1C) on the server (101) (of FIG. 1C).

The machine learning model (134) generates the face image data (157) and the temperature data (159) from the visible image A (130), the visible image B (131), and the thermal image (132). The machine learning model (134) may be a combination of multiple machine learning models. The machine learning model (134) includes the visible image calibration model (135), the cross calibration model (138), the distance generation model (141), the thermal distance calibration model (144), the face detection model (147), the face segmentation model (150), and the temperature detection model (153). Within the machine learning model (134), the output of one model may be used as the input to another model. Mathematical and machine learning algorithms used by the machine learning model (134) may include neural network algorithms, random forest algorithms, logistic regression algorithms, decision tree algorithms, K nearest neighbor algorithms, Stochastic gradient descent algorithms, kernel approximation algorithms, etc.

The visible image A (130) is from the visible camera A (122) (of FIG. 1C). The visible image B (131) is from the visible camera B (124) (of FIG. 1C) from a perspective that is different from the perspective of the visible camera A (122). The thermal image (132) is from the thermal camera (123) (of FIG. 1C) and may be from a perspective that is different from the perspectives of the visible camera A (122) and the visible camera B (124).

The visible image calibration model (135) calibrates the visible image A (130) with the visible image B (131) to form the visible image layers (136). The visible image layers (136) include values for a red layer, a green layer, and a blue layer with calibrated image data from the visible image A (130) and the visible image B (131).

In one embodiment, the values for the pixels from the visible image A (130) that overlap with the pixels from the visible image B (131) may be used to generate the values in the visible image layers (136). For example, the bottom right corner of the visible image A (130) and the top left corner of the visible image B (131) may share the same perspective and overlap and the values for the visible image layers (136) may include the values from the visible image A (130) with the top portion and the left portion of the visible image A (130) removed or masked.

The cross calibration model (138) (also referred to as the thermal visible cross calibration model), calibrates the thermal image (132) to the visible image A (130) and the visible image B (131) forming the calibrated thermal image (139) the cross calibration model (138) may identify the overlap between the thermal image (132), the visible image A (130), and the visible image B (131). The cross calibration model (138) may also extrapolate the thermal image (132) to a different resolution to match the resolution of the visible images. The dimensions of the calibrated thermal image (139) may match with the dimensions of the visible image layers (136).

The distance generation model (141) generates the distance layer (142). The input to the distance generation model (141) may include the visible image layers (136) and the portion of the visible image B (131) that overlaps with the visible image layers (136). In one embodiment, the distance generation model (141) may include a neural network that outputs a distance value for each pixel of the image that identifies a distance from the image sensor system (121) (of FIG. 1C) to the surface of the object that corresponds to the pixel. For example, when the object is a person's forehead that is 2 meters away from the image sensor system (121) (of FIG. 1C), the value of the corresponding pixel may identify that the distance is 2 meters. The dimensions of the distance layer (142) may be the same as the dimensions of the visible image layers (136) with each pixel in the distance layer (142) comprising a distance value.

The thermal distance calibration model (144) generates the thermal layer (145). The thermal distance calibration model (144) may use the distance layer (142) and the calibrated thermal image (139) as inputs. In one embodiment, the thermal distance calibration model (144) may include a neural network that outputs calibrated thermal values to the thermal layer (145). The calibrated thermal values adjust the values from the calibrated thermal image (139) based on the distance between the image sensors (121) (of FIG. 1C) and the object being imaged.

The face detection model (147) detects the presence of faces in the visible images. In one embodiment, the face detection model (147) receives the visible image layers (136) as an input, detects a face, and generates the face location (148), which identifies the location of the face in the visible image layers (136). In one embodiment, the face detection model (147) may include a neural network that takes the visible image layers (136) as input and generates an output that identifies the locations of the faces detected in the visible image layers (136). In one embodiment, the output may be include a set of images from the visible image layers (136) that include a face.

The face segmentation model (150) identifies pixels related to a forehead of a person from the faces that have been detected in the visible images. In one embodiment, the face segmentation model (150) includes a neural network that receives an image of a face from the face detection model (147) and identifies the pixels that correspond to the forehead on the face with the forehead location (151).

The temperature detection model (153) identifies the body temperature of a person in the visible images from the thermal image (132). The temperature detection model (153) identifies the pixels from the thermal layer (145) that correspond to the forehead location (151). In one embodiment, the temperature detection model (153) may average the temperature of the pixels that correspond to the forehead location (151) to generate the forehead temperature (155).

The face image data (157) and the temperature data (159) may be the outputs of the machine learning model (134). The face image data (157) may include the locations of the faces from the visible images (130) and (131). In one embodiment the face image data (157) includes face images extracted from the visible images (130) and (131). The temperature data (159) includes the forehead temperatures identified by the temperature detection model (153) that correspond to the faces in the face image data (157).

The notification generator (161) generates and transmits notifications. In one embodiment, the notification generator (161) receives the face image data (157) and the temperature data (159). When the temperature data (159) indicates that a person captured in visible images (130) and (131) has a forehead temperature that is above a temperature threshold, the notification generator (161) may generate a notification. The notification may include the face image and the forehead temperature that correspond to the person detected as having a forehead temperature above the temperature threshold. A notification may include face images and temperatures for multiple people captured in the visible images (130) and (131).

Turning to FIG. 1B, the training application (103) trains the machine learning model (134) used by the system (100) (shown in FIG. 1C). Each of the machine learning models that form the machine learning model (134) may be trained independently or collectively with each other. The machine learning model (134) takes the training input (172), generates the training output (176) from the training input (172), uses the update function (178) to compare the training output (176) to the expected output (180), and updates the machine learning model (134). The updates may be in accordance with or proportional to the errors observed between the training output (176) and the expected output (180) by the update function (178).

In one embodiment, the machine learning model (134) includes a neural network model that uses forward propagation to generate the training output (176) from the training input (172). The update function (178) uses backpropagation to update the weights of the neural network of the machine learning model (134) based on the error between the training output (176) and the expected output (180).

Turning to FIG. 1C, the system (100) trains and uses machine learning models for body temperature detection. The system (100) includes the image sensor system (121), the server (101), the repository (106), the developer device (115), and the user device (117).

The image sensor system (121), captures images, processes the images, and may transmit video streams, images, and notifications to the server (101). The image sensor system (121) may be an embodiment of the computing system (400) and the nodes (422) and (424) of FIG. 4A and FIG. 4B. In one embodiment, the image sensor system (121) is implemented with a small form factor single board computer (e.g., a Jetson Nano). The image sensor system (121) includes the processor B (125) and the memory B (126) that execute in store programs on the image sensor system (121), including the sensor system application (128). The image sensor system (121) includes the visible camera A (122), the visible camera B (124), and the thermal camera (123). The image sensor system (121) may be one of multiple image sensor systems connected to the system (100).

The visible camera A (122) and the visible camera B (124) may each be a separate camera module with optics, image sensor, controller, and memory that capture visible light (e.g., light with wavelengths of about 380 to 750 nanometers) and generate visible light images (referred to as visible images). In one embodiment, the visible images captured by the cameras are in an RGB (red green blue) format with each pixel having values for red, green, and blue. Other formats may be used. In one embodiment, the resolution of the visible images from the visible camera A (122) and the visible camera B (124) is high definition, e.g., with 1920 by 1080 pixel resolution, 4K resolution, etc.

The thermal camera (123) may be a separate camera module with optics, thermal image sensor, controller, and memory that captures infrared light (e.g., light with wavelengths of about 1 to 14 micrometers) and generates thermal images. The resolution of the thermal images from the thermal camera (123) may be less than the resolution of the images from the visible camera A (122) and the visible camera B (124). In one embodiment, the thermal camera (123) is juxtaposed between the visible camera A (122) and the visible camera B (124).

The sensor system application (128) may operate in conjunction with the server application (102) to process and analyze the images from the cameras of the image sensor system (121). The sensor system application (128) is a set of programs that may be stored in the memory B (126) and execute on the processor B (125). The sensor system application (128) may receive, process, store, and transmit data. For example, the sensor system application (128) may receive image data from the cameras (122), (123), (124), process and store the data, and transfer the data to the server (101).

Figure 4A:
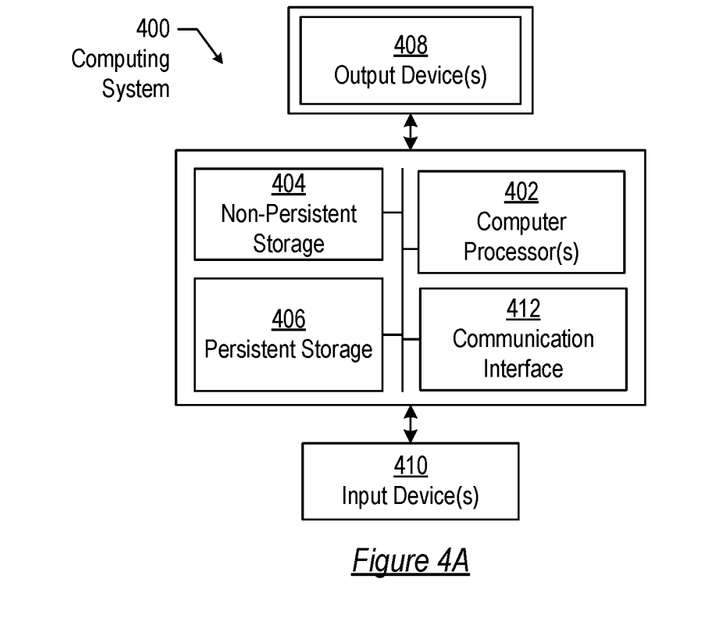
FIG. 4A and FIG. 4B show computing systems in accordance with disclosed embodiments.
Figure 4B:
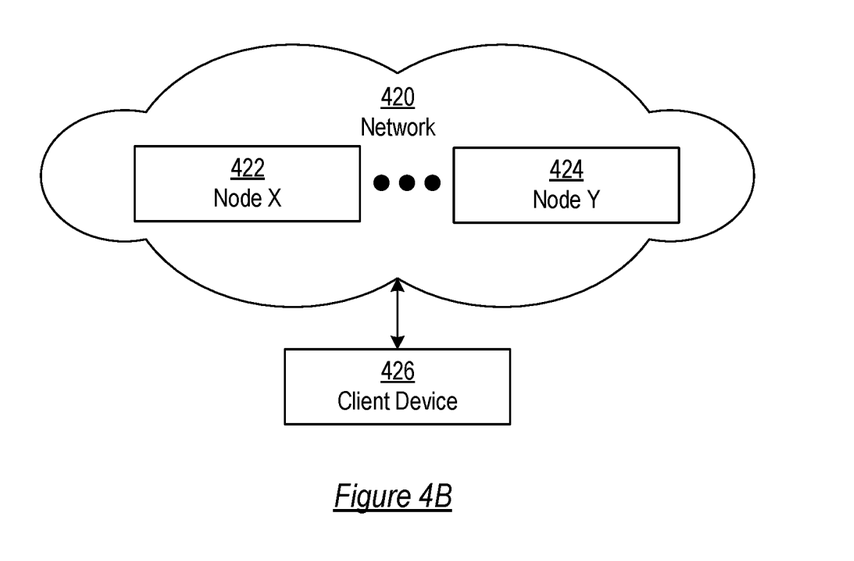

The server (101) is an embodiment of the computing system (400) and the nodes (422 and 424) of FIG. 4A and FIG. 4B. The server (101) may be one of a set of virtual machines hosted by a cloud services provider to deploy the training application (103) and the server application (102). The server (101) includes the processor A (104) (which may include multiple processors) and the memory A (105) (which may include multiple memories) that execute and store the applications and programs running on the server (101). Each of the programs running on the server (101) may execute inside one or more containers hosted by the server (101).

The server application (102) is a program on the server (101). The server application (102) includes multiple programs used by the system (100) to interact with the user device (117), present data to a user of the user device (117). In one embodiment, the server application (102) may deploy machine learning models (stored in the machine learning model data (109) in the repository (106)) to the image sensor system (121). In one embodiment, the server application (102) may receive a face image from the image sensor system (121) and identify the person from the face image using a face recognition machine learning model. In one embodiment, the server application (102) may transmit a video stream to the user application (118). The video stream may be adjusted to identify a location of a person and identify a body temperature of the person within the images of the video stream.

The training application (103) is a program on the server (101). The training application (103) trains the machine learning models using the machine learning model data (109) and the training data (110). The training application (103) may be operated or controlled by the developer device (115) with the developer application (116).

The repository (106) is a computing system that may include multiple computing devices in accordance with the computing system (400) and the nodes (422) and (424) described below in FIGS. 4A and 4B. The repository (106) may be hosted by a cloud services provider. The cloud services provider may provide hosting, virtualization, and data storage services as well as other cloud services and to operate and control the data, programs, and applications that store and retrieve data from the repository (106). The data in the repository (106) may include the image data (107), the machine learning model data (109), and the training data (110).

The image data (107) is data received by the system (100) from the image sensor system (121). The image data (107) in the repository (106) may include raw data and may include processed data. For example, the raw data may include data (images, video, etc.) transmitted directly from the image sensor system (121) that is received by the server (101) and stored in the repository (106). The processed data may include data from the image sensors of the system (100) that have been processed, which may include locations of faces and persons, body temperatures, modified images and video, etc.

The machine learning model data (109) may include the code and data that form the machine learning models used by the system (100). For example, the weights of the models may be part of the machine learning model data (109), including the weights of a neural network. The machine learning models of the system include mathematical models, which may include linear models, exponential models, polynomial models, statistical models, neural network models, etc.

The training data (110) is the data used to train the machine learning models of the system (100). The training data (110) may include pairs of training inputs and expected outputs and may also include the intermediate data generated to train and update the machine learning models of the system (100).

The data in the repository (106) may also include the web page (111) that is part of a website hosted by the system (100). The users and the developers may interact with the website using the user device (117) and the developer device (115) to access the server application (102) and the training application (103).

The developer device (115) is an embodiment of the computing system (400) and the nodes (422 and 424) of FIG. 4A and FIG. 4B. In one embodiment, the developer device (115) is a desktop personal computer (PC). The developer device (115) includes the developer application (116) for accessing the training application (103). The developer application (116) may include a graphical user interface for interacting with the training application (103) to control training and updating the machine learning models of the system (100).

The user device (117) is an embodiment of the computing system (400) and the nodes (422 and 424) of FIG. 4A and FIG. 4B. In one embodiment, the user device (117) is a desktop personal computer (PC), a smartphone, a tablet, etc. The user device (117) may be used to access the web page (111) of the website hosted by the system (100). The user device (117) includes the user application (118) for accessing the server application (102). The user application (118) may include multiple interfaces (graphical user interfaces, application program interfaces (APIs), etc.) for interacting with the server application (102). A user may operate the user application (118) to perform tasks with the server application (102) to interact with the system (100). The results may be presented by being displayed by the user device (117) in the user application (118). For example, the user application (118) may display video streams and body temperatures collected and generated by the system (100).

The developer application (116) and the user application (118) may be web browsers or native applications that access the server application (102) and the training application (103) using resources hosted by the server (101). The developer application (116) and the user application (118) may additionally be web services that communicate with the server application (102) and the training application (103) using representational state transfer application programming interfaces (RESTful APIs). Although FIG. 1C shows a client server architecture, one or more parts of the training application (103) and the server application (102) may be local applications on the developer device (115) and the user device (117) without departing from the scope of the disclosure.

Figure 2A:
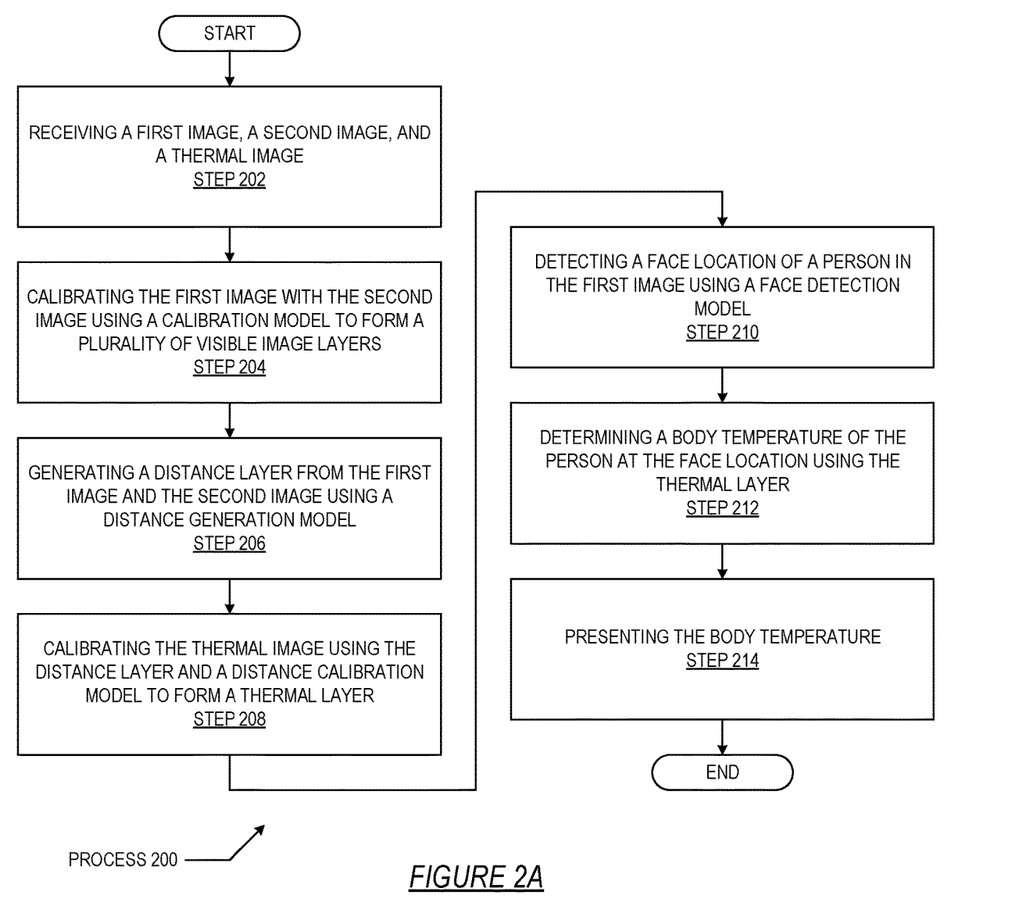
FIG. 2A and FIG. 2B show flowcharts in accordance with disclosed embodiments.
Figure 2B:
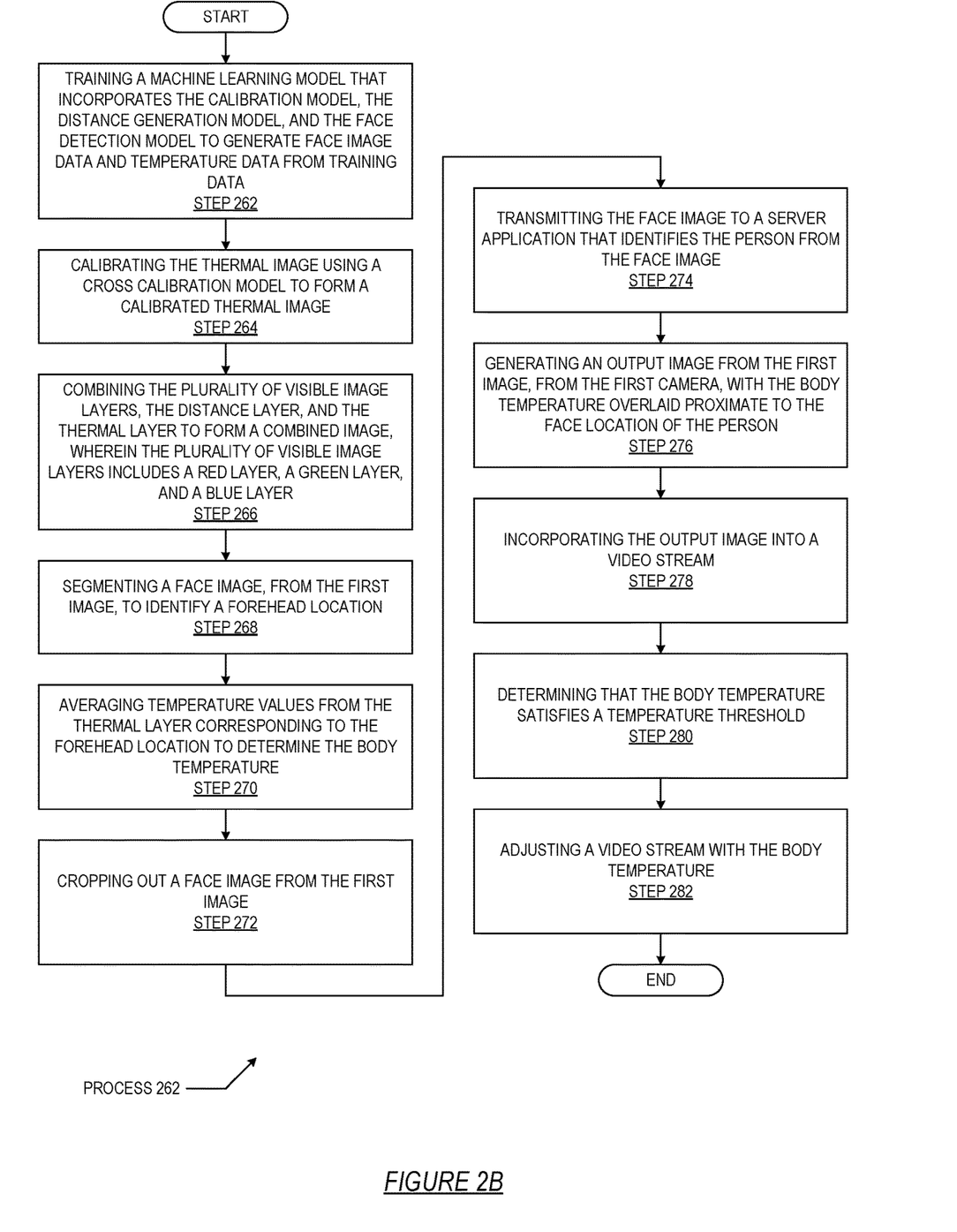

FIGS. 2A and 2B show flowcharts of processes in accordance with the disclosure. The process (200) of FIG. 2A uses machine learning models to perform body temperature detection from images. The process (260) of FIG. 2B trains and uses machine learning models to detect body temperature from images. The embodiments of FIGS. 2A and 2B may be combined and may include or be included within the features and embodiments described in the other figures of the application. The features of FIGS. 2A and 2B are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) uses machine learning models to detect body temperature from image data. At Step 202, a first image, a second image, and a thermal image are received. The images may be received by an image sensor system from a set of cameras. The set of cameras may include a pair of stereoscopic visible light cameras and a thermal camera.

At Step 204, the first image is calibrated with the second image using a calibration model to form a plurality of visible image layers. The images may be calibrated by determining the fields of view for each image, identifying the overlap between the fields of view, and identifying the pixels from each image that correspond to the overlapping fields of view.

At Step 206, a distance layer is generated from the first image and the second image using a distance generation model. In one embodiment, the distance layer is generated from the pixels of the first image and the second image that correspond to overlapping fields of view.

At Step 208, the thermal image is calibrated using the distance layer and a distance calibration model to form a thermal layer. In one embodiment, the resolution of the thermal image may be adjusted to match the resolution of the visible images for at least the portions of the images that correspond to overlapping fields of view.

At Step 210, a face location of a person is detected in the first image using a face detection model. In one embodiment, a convolutional neural network may be used to identify the face location from the pixels of the visible layers formed by calibrating the first and second images.

At Step 212, a body temperature of the person is determined at the face location using the thermal layer. In one embodiment, the body temperature may be determined by identifying pixels associated with the location of the forehead of the person and averaging the thermal values for the pixels of the forehead.

At Step 214, the body temperature is presented. In one embodiment, the body temperature may be presented by transmitting the body temperature from an image sensor system to a server, which transmits the body temperature to a user device that displays the body temperature. The body temperature may be displayed on an image or video that includes the person corresponding to the body temperature. In one embodiment, the body temperature may be transmitted by the image sensor system as a notification that is generated in response to the body temperature being above a temperature threshold.

Turning to FIG. 2B, the process (260) trains and uses machine learning models to detect body temperature from image data. At Step 262, a machine learning model is trained to generate face image data and temperature data from training data. In one embodiment, the machine learning model incorporates the calibration model, the distance generation model, and the face detection model. Each of the models may be trained independently or in conjunction with each other.

At Step 264, the thermal image is calibrated using a cross calibration model to form a calibrated thermal image. The cross calibration may identify the pixels of the visible images and the thermal image correspond to overlapping fields of view.

At Step 266, the plurality of visible image layers, the distance layer, and the thermal layer are combined to form a combined image. The plurality of visible image layers may include a red layer, a green layer, and a blue layer.

At Step 268, a face image is segmented to identify a forehead location. The face image may be extracted from the raw image data from one of the visible images after location of the face has been detected.

At Step 270, temperature values from the thermal layer corresponding to the forehead location are averaged to determine the body temperature. The temperature values from the thermal layer that are used are selected from the pixels in the thermal layer that correspond to the pixels of the location of the forehead of the person in the face image.

At Step 272, a face image from the first image is cropped out. In one embodiment, the locations of the corners of the face image are identified and the area from the image outside of the corners is removed to crop out the face image.

At Step 274, the face image is transmitted to a server application that identifies the person from the face image. In one embodiment, the server application may access a database of potentially matching face images that are compared to the face image identified with the image sensor system. The server application may provide the name of the person in response to matching the face image with one of the potentially matching face images from the database.

At Step 276, an output image is generated from the first image, from the first camera, with the body temperature overlaid proximate to the face location of the person. In one embodiment, the location of the face in the first image may be surrounded with a box and the forehead temperature of the person, whose face is within the box, may be displayed next to the box surrounding the face.

At Step 278, the output image is incorporated into a video stream. In one embodiment, the output image with the body temperature is encoded into a video stream. The video stream may be transmitted by the image sensor system to a server application and may be transmitted by the server application to a user application.

At Step 280, that the body temperature satisfies a temperature threshold is determined. In one embodiment, the temperature threshold may be set at 100.4 degrees Fahrenheit, to which the body temperature is compared.

At Step 282, adjusting a video stream with the body temperature. In one embodiment, the video streams may be adjusted by including an indication that a person, depicted in the images of the video stream, has a body temperature greater than a temperature threshold.

Figure 3A:
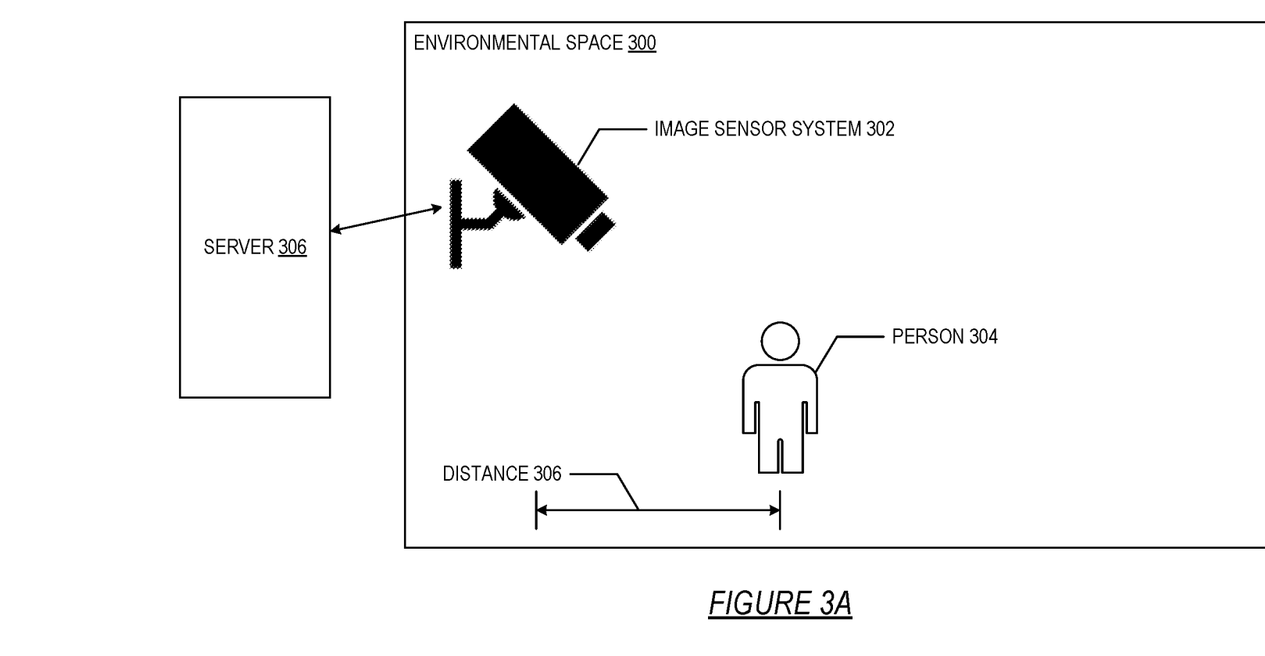
FIG. 3A, FIG. 3B, and FIG. 3C show examples in accordance with disclosed embodiments.
Figure 3B:
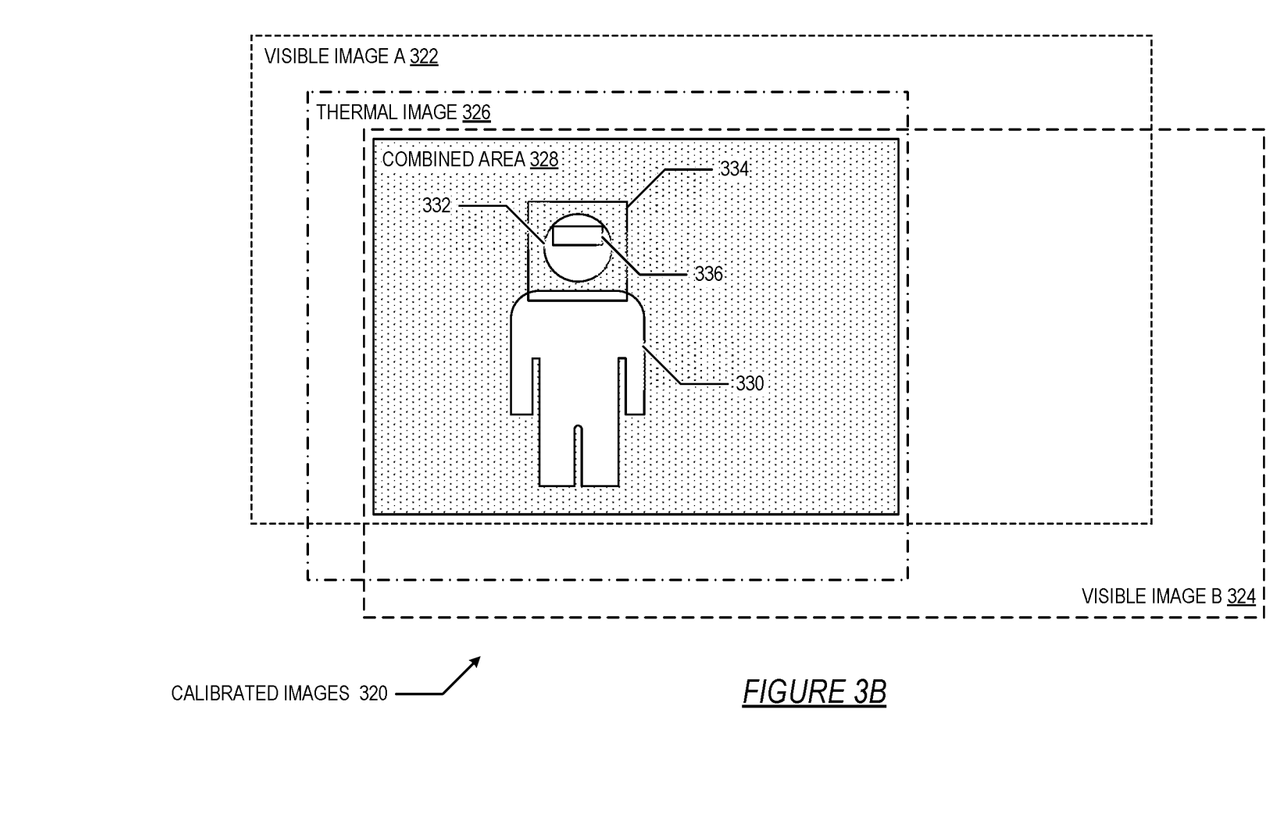
Figure 3C:
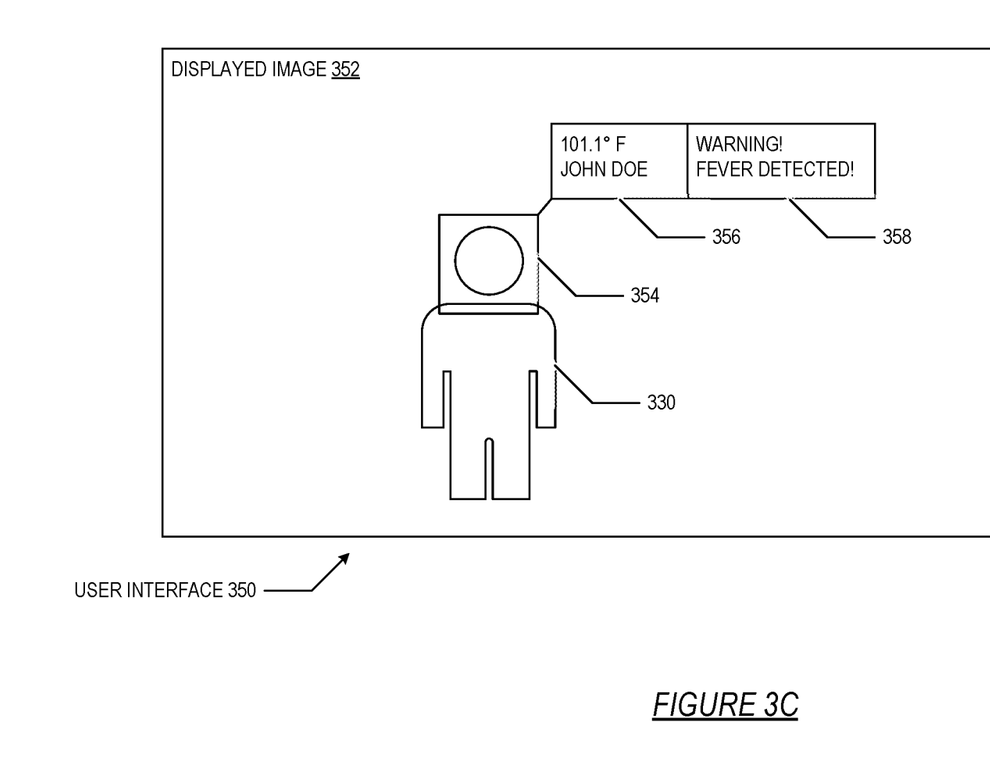

FIGS. 3A, 3B, and 3C show examples of systems that detect body temperature from images. FIG. 3A shows an example of the system capturing images in accordance with the disclosure. FIG. 3B shows an example of the system processing images in accordance with the disclosure. FIG. 3C shows an example of the system displaying images in accordance with the disclosure. The embodiments shown in FIGS. 3A, 3B, and 3C may be combined and may include or be included within the features and embodiments described in the other figures of the application. The features and elements of FIGS. 3A, 3B, and 3C are, individually and as a combination, improvements to the technology of computing systems and machine learning systems. The various features, elements, widgets, components, and interfaces shown in FIGS. 3A, 3B, and 3C may be omitted, repeated, combined, and/or altered as shown. Accordingly, the scope of the present disclosure should not be considered limited to the specific arrangements shown in FIGS. 3A, 3B, and 3C.

Turning to FIG. 3A, the image sensor system (302) is installed in the environmental space (300). In one embodiment, the image sensor system (302) may be installed on a wall within the environmental space (300). The environmental space (300) may be an indoor area, a hallway, an outdoor area, etc. The image sensor system (302) is connected to the server (306).

The server (306) receives body temperature and face images transmitted from the image sensor system (302). The server (306) may identify the person (304) using the face image. The server (306) presents the face image and the body temperature by transmitting the face image and the body temperature to a user device that displays the face image and the body temperature with the user interface (350) (of FIG. 3C).

The person (304) is at the distance (306) away from the image sensor system (302). In one embodiment, the image sensor system (302) provides accurate body temperature to a range of about 3 meters. The person (304) is within the field of view of the cameras of the image sensor system (302).

Turning to FIG. 3B, the calibrated images (320) are generated from the image sensor system (302) (of FIG. 3A). The visible image A (322), the visible image B (324), and the thermal image (326) are aligned to identify the combined area (328) where each of the images overlap. Within the combined area (328), the face (332) (of the person (330)) is within the face image (334). The forehead area (336) is within the face image (334) and includes the pixels that are averaged to determine the body temperature of the person (330).

Turning to FIG. 3C, the user interface (350) shows the displayed image (352). The user interface (350) may be part of a web browser or native application on a user device (e.g., a smartphone or personal computer).

The displayed image (352) may be a modified version of the visible image A (322) (of FIG. 3B). The displayed image (352) is modified to include the box (354) around the face of the person (330), the text box (356), and the alert (358).

The text box (356) displays the temperature detected for the person (330) ("101.1° F.") along with the name of the person (330). In this example, the face image did not match to someone from the database and the name "John Doe" is displayed.

In one embodiment, the alert (358) is displayed when the body temperature of the person (330) exceeds a temperature threshold (e.g., 100.4 degrees Fahrenheit). The temperature exceeds the threshold and the warning (358) is displayed to warn the user that the person captured by the image sensor system may have a fever.

Embodiments of the disclosure may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities that implement the features and elements of the disclosure.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIG. 4A and FIG. 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g., join, full join, count, average, etc.), sorts (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving a first image, a second image, and a thermal image, wherein the first image and the second image are each visible light images;
calibrating the first image with the second image using a calibration model of a machine learning model to form a plurality of visible image layers;
generating a distance layer from the first image and the second image using a distance generation model of the machine learning model;
calibrating the thermal image using the distance layer and a distance calibration model, of the machine learning model, to form a thermal layer;
detecting a face location of a person in the first image using a face detection model of the machine learning model;
determining a body temperature of the person at the face location using the thermal layer; and
presenting the body temperature generated from the first image, the second image, and the thermal image with the machine learning model.

2. The method of claim 1, further comprising:
training the machine learning model that incorporates the calibration model, the distance generation model, and the face detection model to generate face image data and temperature data from training data.

3. The method of claim 1, further comprising:
calibrating the thermal image using a cross calibration model to form a calibrated thermal image.

4. The method of claim 1, further comprising:
combining the plurality of visible image layers, the distance layer, and the thermal layer to form a combined image, wherein the plurality of visible image layers includes a red layer, a green layer, and a blue layer.

5. The method of claim 1, wherein determining the body temperature comprises:
segmenting a face image, from the first image, to identify a forehead location; and
averaging temperature values from the thermal layer corresponding to the forehead location to determine the body temperature.

6. The method of claim 1, further comprising:
cropping out a face image from the first image.

7. The method of claim 6, further comprising:
transmitting the face image to a server application that identifies the person from the face image.

8. The method of claim 1, further comprising:
generating an output image from the first image, from a first camera, with the body temperature overlaid in a text box proximate to the face location of the person; and
incorporating the output image into a video stream.

9. The method of claim 1, further comprising:
determining that the body temperature satisfies a temperature threshold.

10. The method of claim 1, further comprising:
adjusting a video stream with the body temperature.

11. An apparatus comprising:
a first camera;
a second camera;
a thermal camera;
a processor; and
a memory;
the memory comprising an application, wherein the application executes on the processor, uses the memory, and is configured for:
receiving a first image, a second image, and a thermal image, wherein the first image and the second image are each visible light images;
calibrating the first image with the second image using a calibration model of a machine learning model to form a plurality of visible image layers;
generating a distance layer from the first image and the second image using a distance generation model of the machine learning model;
calibrating the thermal image using the distance layer and a distance calibration model, of the machine learning model, to form a thermal layer;
detecting a face location of a person in the first image using a face detection model of the machine learning model;
determining a body temperature of the person at the face location using the thermal layer; and
presenting the body temperature generated from the first image, the second image, and the thermal image with the machine learning model.

12. The apparatus of claim 11, wherein the application is further configured for:
calibrating the thermal image using a cross calibration model to form a calibrated thermal image.

13. The apparatus of claim 11, wherein determining the body temperature comprises:
segmenting a face image, from the first image, to identify a forehead location; and
averaging temperature values from the thermal layer corresponding to the forehead location to determine the body temperature.

14. The apparatus of claim 11, wherein the application is further configured for:
cropping out a face image from the first image; and
transmitting the face image to a server application that identifies the person from the face image.

15. The apparatus of claim 11, wherein the application is further configured for:
combining the plurality of visible image layers, the distance layer, and the thermal layer to form a combined image, wherein the plurality of visible image layers includes a red layer, a green layer, and a blue layer.

16. The apparatus of claim 11, wherein the application is further configured for:
generating an output image from the first image, from the first camera, with the body temperature overlaid in a text box proximate to the face location of the person; and
incorporating the output image into a video stream.

17. The apparatus of claim 11, wherein the application is further configured for:
determining that the body temperature satisfies a temperature threshold.

18. The apparatus of claim 11, wherein the application is further configured for:
adjusting a video stream with the body temperature.

19. A system comprising:
an image sensor system; and
a server;
the image sensor system comprising a sensor system application, executing on a processor of the image sensor system, configured for:
receiving a first image, a second image, and a thermal image, wherein the first image and the second image are each visible light images;
calibrating the first image with the second image using a calibration model of a machine learning model to form a plurality of visible image layers;
generating a distance layer from the first image and the second image using a distance generation model of the machine learning model;
calibrating the thermal image using the distance layer and a distance calibration model, of the machine learning model, to form a thermal layer;
detecting a face location of a person in the first image using a face detection model of the machine learning model;
determining a body temperature of the person at the face location using the thermal layer; and
transmitting the body temperature and a face image from the first image to the server wherein the body temperature is generated from the first image, the second image, and the thermal image with the machine learning model; and
the server comprising a server application, executing on a processor of the server, configured for:
identifying the person from a face image; and
presenting the face image and the body temperature.

20. The system of claim 19, wherein system further comprises:
the server comprising a training application, executing on a processor of the server, configured for:
training the machine learning model that incorporates the calibration model, the distance generation model, and the face detection model to generate face image data and temperature data from training data.

* * * * *